United States Patent [19]

Stötzel et al.

[11] 4,047,621

[45] Sept. 13, 1977

[54] STACKING APPARATUS FOR FERROUS SHEETS

[76] Inventors: Lothar Stötzel, Buschhuttener Strasse 87; Dieter Heider, Bottenbacher Strasse 73, both of 5910 Kreuztal-Buschhutten, Germany

[21] Appl. No.: 668,033

[22] Filed: Mar. 18, 1976

[51] Int. Cl.$^2$ .................... B65G 57/04; B65H 31/26
[52] U.S. Cl. ..................................... 214/6 DS; 214/8
[58] Field of Search ............... 214/6 DS, 8; 271/193, 271/207, 213; 29/203 L, 211 L, 241, 433

[56] References Cited

U.S. PATENT DOCUMENTS

| | | | |
|---|---|---|---|
| 1,539,447 | 5/1925 | Von Pein | 271/207 |
| 2,374,174 | 4/1945 | Buccicone | 214/6 DS X |
| 3,014,601 | 12/1961 | Swanson | 214/8 |
| 3,132,858 | 5/1964 | Bernard | 214/6 DS X |
| 3,523,686 | 8/1970 | Cawley | 214/8 X |
| 3,946,884 | 3/1976 | Kato et al. | 214/8 X |

*Primary Examiner*—L. J. Paperner
*Attorney, Agent, or Firm*—Young & Thompson

[57] ABSTRACT

Stacking apparatus for ferrous sheets, for example transformer sheets having holes therethrough, comprises a plurality of power-driven magnetic conveyors in lengthwise alignment with each other, for receiving and conveying ferrous sheets on the undersides of the conveyors. Upon deenergization of the conveyors, the sheets fall on a lowerator which is progressively lowered as the stack is formed. If the sheets are pierced, then pins extending vertically above and below the lowerator to a position immediately below the conveyors, engage in the holes in the sheets to align the sheets and retain the stack. The pins do not lower; instead, when the stack is complete, the lowerator and the pins can be removed together transversely of the conveying direction.

4 Claims, 14 Drawing Figures

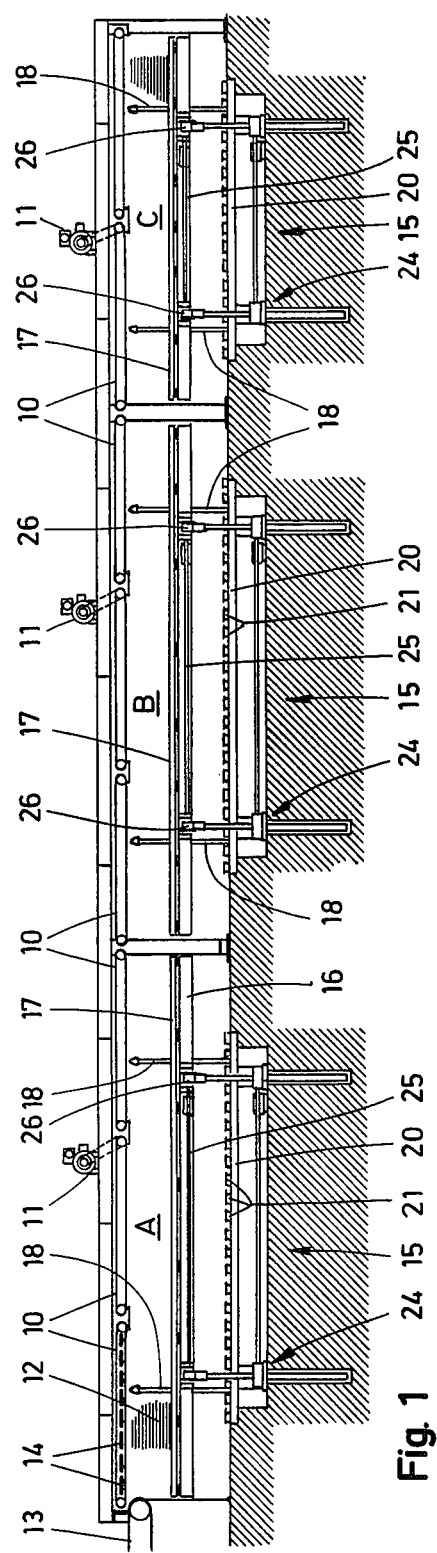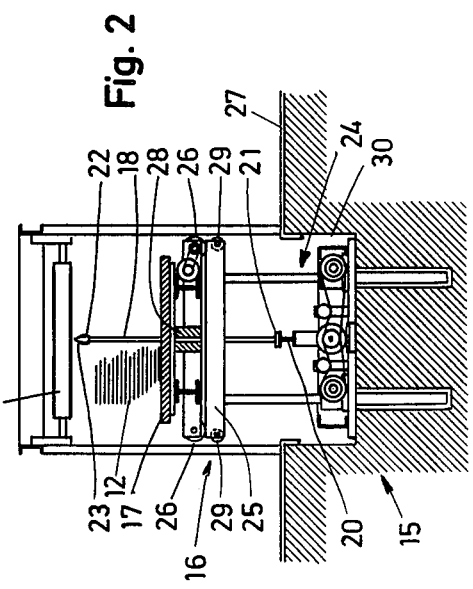

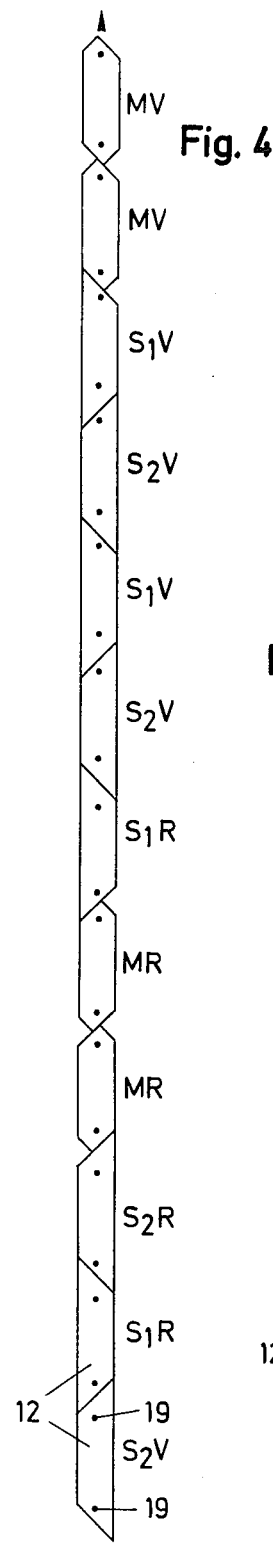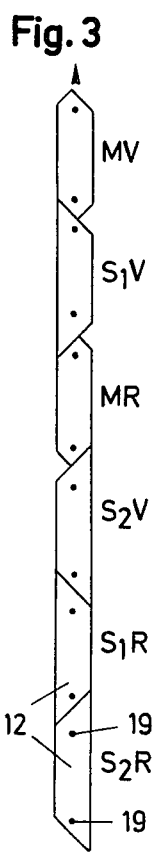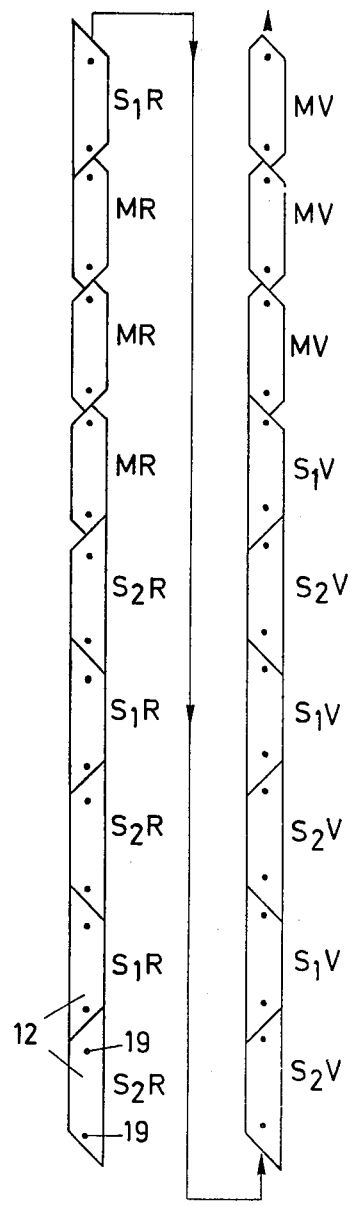

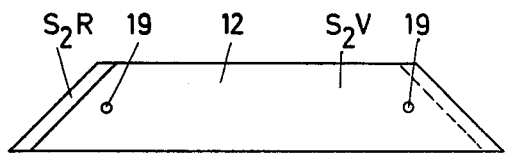
Fig. 7
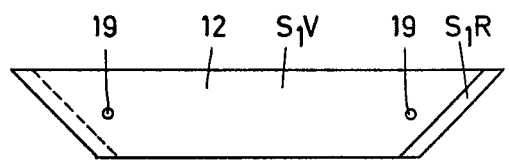
Fig. 8
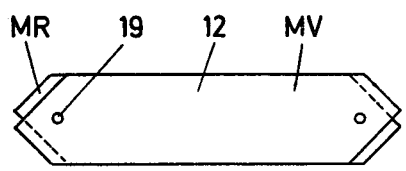
Fig. 9
Fig. 10
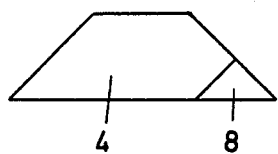
Fig. 11
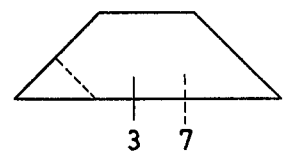
Fig. 12
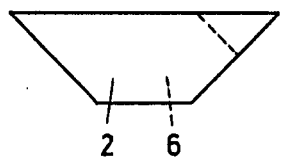
Fig. 13
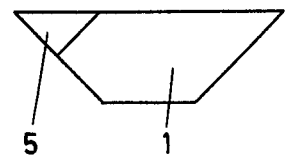

STACKING APPARATUS FOR FERROUS SHEETS

This invention relates to stacking apparatus for ferrous sheets, for example transformer sheets, which latter are continuously taken off from a storage reel and are cut to length and shape by means of a swivel-type cutting shear.

A guiding mechanism for the equal-edged stacking of sections of strip material has been described in German Pat. No. 1,221,974 wherein an oblique wedge is employed behind a roller table, this wedge being responsive to the position of the forward cut edges of the strip material sections. But by means of this guiding mechanism, in practice only two different sheet packs can be stacked, so that there is still a great amount of manual labor required, for example to stack three leg packs of a three-legged transformer core as may be needed for the assembly of the total core.

The invention solves the problem of providing a stacking apparatus for use in a strip cutting plant which is program-controlled electronically, making it possible to deposit three or more sheet packs in succession independently of the cutting edge in such a way as may be required for the assembly of a transformer core.

This end is attained according to the invention primarily by providing conveyor belts which are arranged in the conveying direction one behind the other downstream of the swivel-type cutting shear, picking up the transformer sheets in the suspended condition by means of switched magnets, and equipped with program-controlled drive mechanisms; while underneath the conveyor belts, stacking pallets are disposed on carriages which latter can be continuously lowered in correspondence with the height of the stack.

In a suitable further development of the invention, threading pins extending into the close proximity of the conveyor belts underneath the latter and being fixed in their height with respect to the associated carriage are provided, and the transformer sheets have threading holes arranged at the spacing of the threading pins, these holes receiving the threading pins.

Advantageously, the threading pins are mounted on traverses or crossrails arranged so that they can be moved away together with the pallets and the lowerable carriages.

Each threading pin has a threading head corresponding to the diameter of the threading holes of the transformer sheets, with a conical tip, the remaining portion of the threading pin being of a smaller diameter.

To adapt to any desired sheet length, the traverse has a plurality of holders for the threading pins at uniformly fixed spacings.

Advantageously, several conveyor belts are combined into respectively one stacking station.

The invention will now be described with reference to the drawings, showing an embodiment thereof, to wit:

FIG. 1 is a lateral view of a stacking apparatus according to the invention;

FIG. 2 is a section along line II—II in FIG. 1;

FIG. 3 shows the sequence of sheets for the stacking of leg packs, with one sheet per layer, for a three-legged transformer core;

FIG. 4 shows the sequence of sheets for leg packs with two sheets per layer;

FIG. 5 shows the sheet sequence for leg packs with three sheets per layer;

FIGS. 6a and 6b show top views of two layers of a three-legged transformer core wherein the sheet packs are stacked in correspondence with the yoke and leg programs, while FIGS. 7-13 show respectively two individual sheets of the leg and yoke sections, respectively, of the transformer core of FIGS. 6a and 6b, as they are placed one on top of the other with the formation of overlapping edges.

Figure 6A:
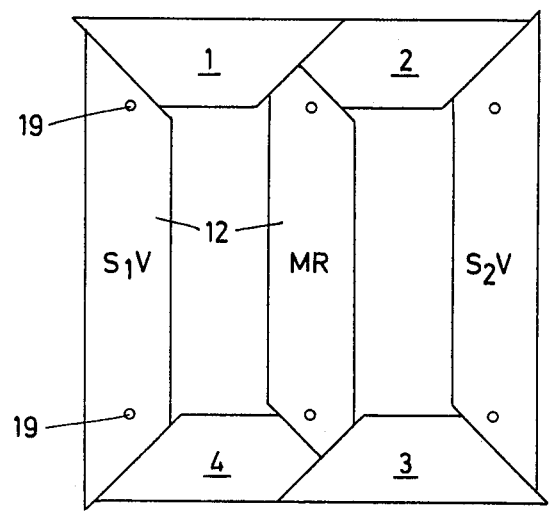

The stacking apparatus shown as an embodiment in FIGS. 1 and 2 comprises several series-arranged conveyor belts 10, several of which are combined into a stacking station A, B, or C. Each station A, B, and C is driven by a D.C. motor 11. The transformer sheets, indicated at 12, are fed from a swivel-type cutting shear, not shown, via a feeding conveyor belt 13 to the first of the conveyor belts 10 (from the left-hand side in FIG. 1); this first of the conveyor belts 10 takes over the sheets in a suspended position. This is made possible by switchable magnets 14, indicated at the first conveyor belt 10. The subdivision of the entire conveyor belt zone of the stacking apparatus into the relatively short individual conveyor belts 10 has the advantage that there is no substantial amount of sagging on the bottom side. Otherwise, the magnets 14 would have to be designed to be excessively strong, considering that the transformer sheets 12 hanging underneath the conveyor belts 10 can have a length of up to 6 meters. The magnets 14 are suitably electromagnets, but they could also be permanent magnets which would be "switched off" by corresponding mechanical devices to eliminate their holding effect on the sheets 12 as soon as the latter have reached their stacking position.

A lowering or drop-away mechanism 15 is associated with each station A, B, C of the conveyor belts 10, including a lowerable carriage 16 to receive a pallet 17 on which the transformer sheets 12 are stacked, as indicated, namely in accordance with a predetermined program which will be discussed below. To place the transformer sheets 12 accurately one on top of the other, threading pins 18 are provided; normally, two of such pins are sufficient for each lowering mechanism. The transformer sheets 12 are equipped, for this purpose, with threading holes 19 as shown in FIGS. 3–9. The spacing of the threading holes 19 is equal to the distance of the threading pins 18 which are mounted, at a fixed-level position, on a traverse or crossrail 20 and can be changed in their mutual spacing at this traverse in fixed graduations by being placed in corresponding mountings 21. This makes it possible to adapt to any length of the respective transformer sheets 12. The mountings 21 can be dovetail or C guides, similarly as in a work-holding table of a machine tool.

The threading pins 18 extend underneath the conveyor belts 10 into the close proximity of the latter and have, at their upper ends, a threading head 22 (FIG. 2) larger in diameter than the remaining portion of the respective threading pin 18 and having a conical tip 23 making it still possible to execute the threading step even at a minor misplacement of the respective transformer sheet 12. It should be noted at this point that, during the course of the electronic program control of the entire plant, the D.C. motors 11 for the conveyor belts 10 are operated in slow-speed drive, shortly before the transformer sheet 12 to be deposited has reached its stacking position, which latter can be determined by appropriate non-contacting switches and in which the respective magnets 14 are switched off. The lowerable carriage 16 of the lowering mechanism 15 descends gradually by way of a corresponding spindle drive 24 or the like during the accumulation of the respective sheet stack, wherein the level-fixed threading pins 18, however, remain in their position. The stack of sheets 12 is lowered with the pallet 17 so that the upper sheet layers remain in the range of the broadened threading head 22 and the placement of the uppermost transformer sheet 12 will definitely take place at this level, because the threading head 22, accurately adjusted to the diameter of the threading hole 19, ensures the correct positioning of the sheets 12 within the stack. The sheets 12 located at a lower level, which are fixed in position by the weight of the sheets lying on top thereof, come out of contact with the threading pins 18 during the gradual descent of the carriage 16, so that these pins can later on be readily removed.

After a stack has been completed, the lowerable carriage 16 is made to assume its lowermost position (unless it is already in this position) and can be moved away from a rail frame 25 on which it rests with wheels 26 by way of rails 27 at floor level underneath the stacking apparatus, after the traverse 20 with the threading pin 18 has been coupled to the carriage 16 so that it can be moved out as well. The threading pins 18 secure the stack against collapsing, inasmuch as the latter can consist of differently wide sheets 12 and starts for example, as indicated in FIG. 2, at the bottom with relatively narrow transformer sheets 12 and terminates at the top with sheets that are just as narrow, thus forming a leg pack with a round cross section for a transformer core. In the illustration of FIG. 2, this stack is about half finished.

A guide 28 lowerable together with the carriage 16 and attached thereto provides additional support for the threading pin 18. Furthermore, guide rollers 29 are mounted to the rail frame 25, making it possible to lower the carriage 16 flawlessly into a corresponding recess 30 in the floor.

With reference to FIGS. 3-5, several possible sheet sequences of a program for the ready-for-use stacking of the leg packs for a three-legged transformer core will be briefly described. In this connection, the following designations will be used to identify the individual sheets 12:

MV = middle leg (forward position)
MR = middle leg (rearward position)
$S_1V$ = lateral leg 1 (forward position)
$S_1R$ = lateral leg 1 (rearward position)
$S_2V$ = lateral leg 2 (forward position)
$S_2R$ = lateral leg 2 (rearward position)

FIG. 3 shows the sheet sequence for a three-legged transformer core with one sheet 12 per layer of the leg pack and/or sheet stack. The sheets 12 are fed, as illustrated, in the direction of the arrow from the swivel-type cutting shear by means of the feed conveyor belt 13, while lying on the latter, and are taken over by the conveyor belts 10 in the suspended position; in this connection, reference is had once again to FIG. 1.

At this point, it should furthermore be noted to promote understanding of the invention that the individual layers of a stack or leg pack are stacked so that they can be joined in a "mortise" fashion by means of overlapping edges with the corresponding, adjoining yoke packs of the transformer core, as will be explained in greater detail with reference to FIGS. 6-13.

Each stacking station A, B, or C receives the sheet pack of a certain lateral leg of the transformer core.

Starting with the assumption that, for example, station A receives the lateral leg $S_1$, station B receives the lateral leg $S_2$, and station C receives the middle leg M, then the corresponding transformer sheets 12 of FIG. 3 are stacked as set out below, if the starting component is a middle leg sheet in the forward position (MV): MV is deposited in station C; then sheet $S_1V$ is deposited in station A; then again in station C a sheet of the middle leg is deposited, this time in the rearward position, i.e. MR; then, $S_2V$ is deposited in station B; sheet $S_1R$ is deposited in station A; and finally sheet $S_2R$ is deposited in station B. This completes two layers (a forward position and a rearward position with respectively one sheet) for each leg M, $S_1$, $S_2$. The aforedescribed cycle then starts anew, i.e. with MV.

Similar conditions exist in the sheet sequence according to FIG. 4, except that each forward position and each rearward position comprises two sheets, so that one cycle encompasses 12 sheets instead of 6, i.e. each kind of sheet is laid twice.

The sheet sequence according to FIG. 5 is readily understandable without further explanation, considering that these are forward and rearward positions with respectively three sheets, so that the cycle for the stacking of a forward position and a rearward position in this program example comprises in total 18 sheets 12.

The association of the individual leg packs (M, $S_1$, $S_2$) with the individual stations (A, B, C) took place purely arbitrarily in the preceding description. In practice, this association is effected so that it is most advantageous for the chronological course of the program, i.e. so that the stacking of the leg packs can be conducted with a minimum of time consumption.

Figure 6B:
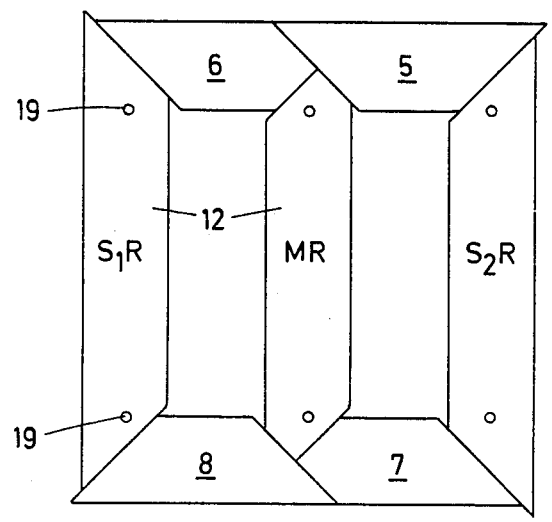

In FIGS. 6a and 6b, top views are shown of a three-legged transformer core which can be composed of transformer sheets 12 of FIGS. 3-5, to wit: FIG. 6a shows a top view of a forward position and FIG. 6b shows a top view of a rearward position. The yoke sheets of the forward position of FIG. 6a are denoted by 1-4, while the yoke sheets of the rearward position of FIG. 6b are denoted by 5-8.

FIGS. 7-13 show how the individual sheets of one layer are disposed on the other layer: In FIG. 7, $S_2V$ is disposed on top of $S_2R$; in FIG. 8, $S_1V$ lies on $S_1R$; in FIG. 9, MV lies on MR; in FIG. 10, the yoke sheet 4 is disposed on the yoke sheet 8; in FIG. 11, element 3 lies on element 7; in FIG. 12, component 2 lies on component 6; and in FIG. 13, sheet 1 rests on sheet 5. In this connection, as mentioned above, the individual sheets per layer can be present singly or severally, of course.

In the individual illustrations of FIGS. 7-13, the overlapping edges can be seen which make it possible to join the components to the yoke sheets 1-8 in the manner of a mortise joint. This mortise connection can also be achieved if the forward layer of FIG. 6a is placed on the rearward layer of FIG. 6b.

The above-described stacking apparatus makes it possible to conduct a fully automatic, program-controlled stacking of the transformer sheets 12, especially the leg packs, in the sequence as required in the finished transformer core. In this connection, it is possible to utilize the threading holes 19 in conjunction with corresponding auxiliary means for the fixation of the sheets within the stack or pack until the total core has been completed. The threading holes 19 do not cause any appreciable magnetic loss of the transformer during operation of the latter.

What is claimed is:

1. Apparatus for forming a stack of ferrous sheets, comprising an endless conveyor belt having magnets for retaining ferrous sheets on the underside of the belt, the magnets being adapted to be de-energized to release the sheets to fall by gravity, a pallet beneath the conveyor to receive the sheets in a stack, means to lower the pallet as the stack grows, vertical pins spaced to enter holes in the sheets, said pins being fixed against vertical movement when the pallet lowers, the pins having upper ends that are disposed closely adjacent the underside of the belt, and means for moving said pallet and pins laterally together as a unit to remove the formed stack from beneath the conveyor.

2. Apparatus as claimed in claim 1, there being a plurality of said conveyors in end-to-end series with each other.

3. Apparatus as claimed in claim 1, each said pin having an enlarged threading head which is larger in diameter than the pin below said threading head.

4. Apparatus as claimed in claim 1, said removing means comprising rails, and means mounting said pallet and pins for rolling movement on said rails in a lowered position of said pallet.

* * * * *